United States Patent [19]
Harkin

[11] Patent Number: 5,978,496
[45] Date of Patent: Nov. 2, 1999

[54] FINGERPRINT SENSING DEVICES AND SYSTEMS INCORPORATING SUCH

[75] Inventor: Gerard F. Harkin, Brighton, United Kingdom

[73] Assignee: U.S. Philips Corporation, New York, N.Y.

[21] Appl. No.: 08/841,910

[22] Filed: Apr. 17, 1997

[30] Foreign Application Priority Data

Apr. 26, 1996 [GB] United Kingdom ................... 9608747

[51] Int. Cl.⁶ .................................................. G06K 9/20
[52] U.S. Cl. .............................................................. 382/124
[58] Field of Search .............................. 382/124; 1/127; 356/71; 361/278, 283.1; 324/663

[56] References Cited

U.S. PATENT DOCUMENTS

| | | | |
|---|---|---|---|
| 4,353,056 | 10/1982 | Tsikos | 340/146.3 E |
| 5,325,442 | 6/1994 | Knapp | 382/124 |
| 5,778,089 | 7/1998 | Borza | 382/124 |

*Primary Examiner*—Andrew W. Johns
*Attorney, Agent, or Firm*—Dwight Renfrew, Jr.

[57] ABSTRACT

A fingerprint sensing device comprises an array of sense elements (12) each of which includes a sense electrode (14) which together with an overlying fingerprint portion forms a capacitor (35). The capacitor is charged by operation of a first switching device (16) via a first address conductor (18). A second switching device (17) is then operated to transfer the charge on the sense electrode to a second address conductor (20) where it is sensed (24) and an output indicative of capacitance provided accordingly. Fast, reliable, scanning is achieved. A row and column array of sense elements is conveniently addressed using sets of row and column conductors (18, 20) and the device can readily be implemented using thin film devices, e.g. TFTs, as the switching devices on an insulating support and with integrated drive circuits.

13 Claims, 3 Drawing Sheets

FINGERPRINT SENSING DEVICES AND SYSTEMS INCORPORATING SUCH

BACKGROUND OF THE INVENTION

1. Field of the Invention

The present invention relates to a fingerprint sensing device comprising an array of sense elements which each comprise a sense electrode. A first switching device is connected to the sense electrode. A first address conductor is operable by a control signal supplied to the first address conductor, from a drive circuit, to apply charge to the sense electrode. The sense electrode of the sense element is spaced from a sensing surface over which is placed a finger whose print is to be sensed. The sense electrode provides in combination with an individual portion of an overlying finger a capacitance. The sense means is connected to each sense element via a second address conductor for providing an output indicative of the capacitances of the sense elements. The invention relates also to a fingerprint recognition system incorporating such a device.

2. Description of the Related Art

A fingerprint sensing device of the above kind is described in U.S. Pat. No. 5,325,442. In this device, the sense elements are arranged in a row and column array and the switching devices of the sense elements comprise thin film transistors, TFTs, connected to a drive circuit via sets of row and column address conductors. The gates of the TFTs of the sense elements in one row are connected to a respective, common, row conductor while the sources of the TFTs of all sense elements in one column are connected to a respective, common, column address conductor. The drain electrode of each TFT is connected to the sense electrode of the sense element. The sense electrodes together with overlying dielectric material and individual fingerprint portions when placed over the dielectric material, constitute capacitors. The row address conductors are connected to a scan circuit which applies a gating (selection) signal to each row conductor in a respective row address period to turn on the TFTs of the sense elements of each row in sequence. Simultaneous with a gating signal, a predetermined potential is applied to the column address conductors to charge the capacitors. The individual capacitances of these capacitors depend on the spacing of the fingerprint portions from the sense electrodes, as determined by the presence of a ridge or a trough of the fingerprint, and are measured by sensing the charging current flowing in the column conductors during charging of the capacitors, using current or charge sensing amplifier circuits incorporated in the drive circuit. At the end of the row address period, the TFTs are turned off and a gating signal applied to the next row conductor to turn on the TFTs of the next row of sense elements. Each row of sense elements is addressed in this manner in turn and the variation in sensed capacitances produced over the array of sense elements by a fingerprint ridge pattern provides an electronic image or representation of the three dimensional form of the fingerprint surface.

In order to allow consecutive readings of the capacitance image of a fingerprint, or readings of different fingerprints, in successive field scan operations, the charge on the sense electrodes is removed, or at least reduced, before the sense elements are addressed again. This is achieved either by incorporating a resistor in each sense element which is connected between the sense electrode and ground, by changing the predetermined voltage applied to column conductors in successive read cycles, or by arranging the drive circuit to include an intermediate reset cycle between successive read cycles. The provision of a resistor, for example using a doped semiconductor material, is difficult and complicates the fabrication of the sense element array, while the other two discharge schemes cause complications to the drive circuit. Moreover, it is important in this device for minimizing cross-talk problems that there is highly controlled, or low, leakage in the TFTs and that the leakage characteristics of the TFTs across the array are substantially uniform. This can be difficult to achieve, particularly if the TFTs are formed on a polymer substrate. The speed at which successive read-outs could be achieved would also be compromised by the need for these discharge schemes.

OBJECTS AND SUMMARY OF THE INVENTION

It is an object of the present invention to provide an improved fingerprint sensing device.

According to one aspect of the present invention, a fingerprint sensing device of the kind described in the opening paragraph is characterised in that each sense element includes a second switching device which is connected between the sense electrode and the second address conductor and which is operable by the drive circuit following operation of the first switching device to transfer the charge on the sense electrode to the second address conductor.

By virtue of the two switching devices being arranged to be operated by the drive circuit in succession so as to apply charge to the capacitor formed by the sense electrode and an overlying fingerprint portion and then to transfer the charge to an address conductor of the second set where it is sensed, fast and reliable read-outs from the array are possible. The amount of the charge being applied to the address conductor depends on the capacitance produced by the fingerprint. It is no longer necessary, as it was in the prior art to discharge the capacitances of the individual sense elements by using resistances, which limits the scan speed, by introducing reset cycles, or by changing drive signals, all of which complicate the drive circuit as well as affect the scan speed. With the invention, the control signals needed for operating the sense elements can be of very simple form, and an uncomplicated drive circuit, capable of fast operation, can be used.

The sense elements are preferably arranged in rows and columns and connected to sets of first and second address conductors extending in the row and column directions with the first switching devices of each sense element in a row being connected to a common address conductor of the first set and with the second switching device of each sense element in a column being connected to a common address conductor of the second set. In this case, the drive circuit may conveniently be arranged to supply a control signal to each of the address conductors of the first set in sequence so as to operate the first switching devices of the sensing elements on a row by row basis.

Preferably the second switching devices of the sense elements in a row are coupled to an address conductor of the first set which is different to that to which the first switching devices of the row of sense elements are connected and are operable by a control signal applied to that different address conductor. Conveniently, the address conductor of the first set to which the second switching devices of a row of sense elements are coupled comprises an address conductor to which the first switching devices of the adjacent row of sense elements are connected.

The first and second switching devices of the sense elements may comprise transistors. With regard to the first switching devices, a first main terminal of the transistor is preferably coupled to the address conductor of the first set to which its control electrode is connected, the second main terminal being connected to the sense electrode of the sense element. In this way, the potential applied to the sense electrode upon operation of the first switching device conveniently is provided by the control signal used to operate the switching device. Alternatively, the first main terminals of the first switching devices in a row may be connected to a separate supply line. In a preferred embodiment, the transistors of the array of sense elements comprise thin film transistors (TFTs) which, together with the sets of address conductors and the sense electrodes, are provided on an insulating support, for example of polymer material or glass. Because of the nature of the sense elements, the low or controlled leakage and uniformity requirements for the TFTs is much less critical than with the known arrangement. The removal of the need for controlled or low leakage in the TFTs means that the TFT fabrication requirements can be much less stringent which greatly facilitates the use of TFTs on polymer substrates rather than glass. The first switching devices could alternatively be two terminal non-linear switching devices connected between the associated address conductor of the first set and the sense electrodes, for example comprising thin film diodes, although from an ease of fabrication point of view when using thin film technology it is preferred that the first and second switching devices are of the same kind. The TFTs may comprise amorphous silicon devices. In a preferred embodiment, however, the TFTs comprise polysilicon TFTs. For convenience, the drive circuit is preferably integrated on the support and fabricated simultaneously with the sense element TFTs and the sets of address conductors and this is readily possible using polysilicon technology. Inexpensive and compact sensing devices are then obtained which are ideally suited to, for example, integration in smart cards and the like.

According to another aspect of the present invention there is provided a fingerprint recognition system comprising a sensing device in accordance with the one aspect of the invention, means responsive to the output from the sense means of the device to provide characteristical data of a sensed fingerprint, and means for comparing said characteristical data with stored characteristical data for one or more fingerprints.

BRIEF DESCRIPTION OF THE DRAWINGS

Embodiments of fingerprint sensing devices, and a fingerprint recognition system incorporating such, in accordance with the invention will now be described, by way of example, with reference to the accompanying drawings, in which.

It is to be understood that the Figures are merely schematic and are not drawn to scale. Certain dimensions may have been exaggerated while others have been reduced. The same reference numbers are used throughout the Figures to indicate the same, or similar, parts.

DETAILED DESCRIPTION OF THE PREFERRED EMBODIMENTS

Figure 1:
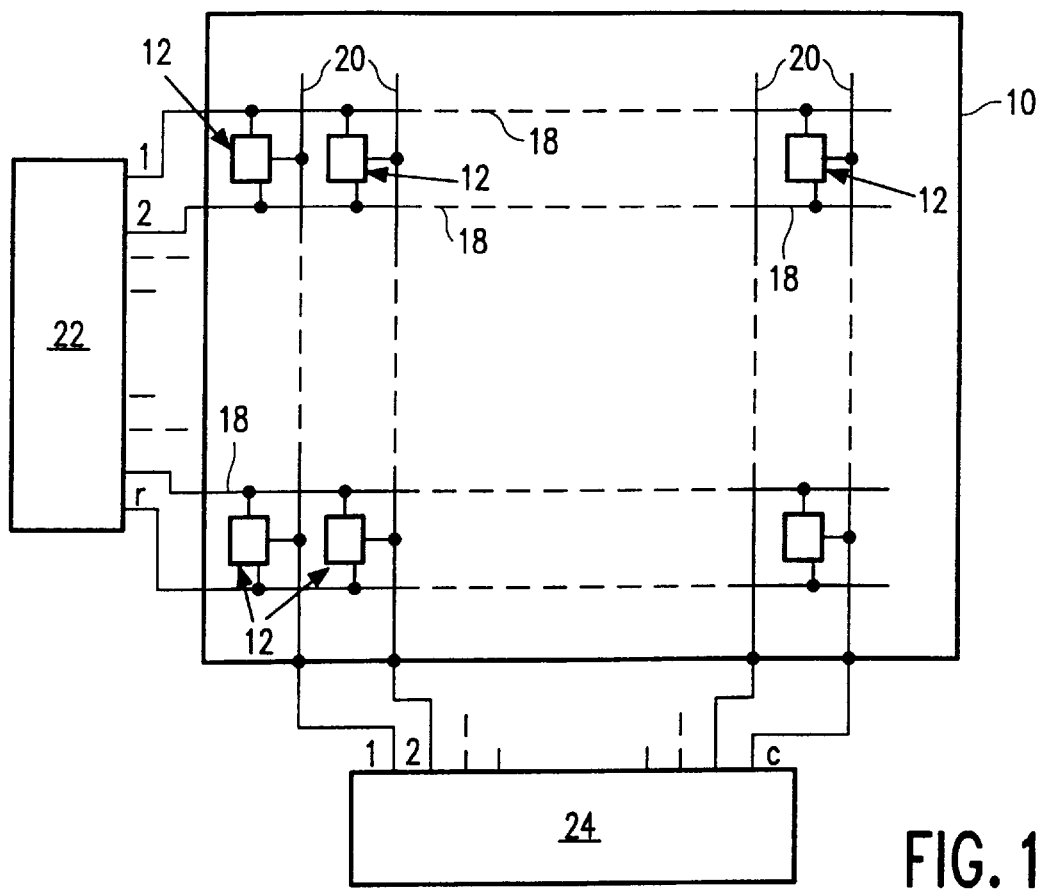
FIG. 1 is a simplified schematic diagram of an embodiment of the sensing device showing an array of sense elements together with associated addressing circuitry.

Referring to FIG. 1, the fingerprint sensing device comprises an active matrix addressed sensing pad 10 having an X-Y array of regularly-spaced sense elements 12 consisting of r rows (1 to r) each with c sense elements, which are operable to scan a fingerprint. Only a few rows and columns are shown for simplicity. In practice there may be around 512 rows and 512 columns of sense elements occupying an area of approximately 2.5 cms by 2.5 cms.

Figure 2:
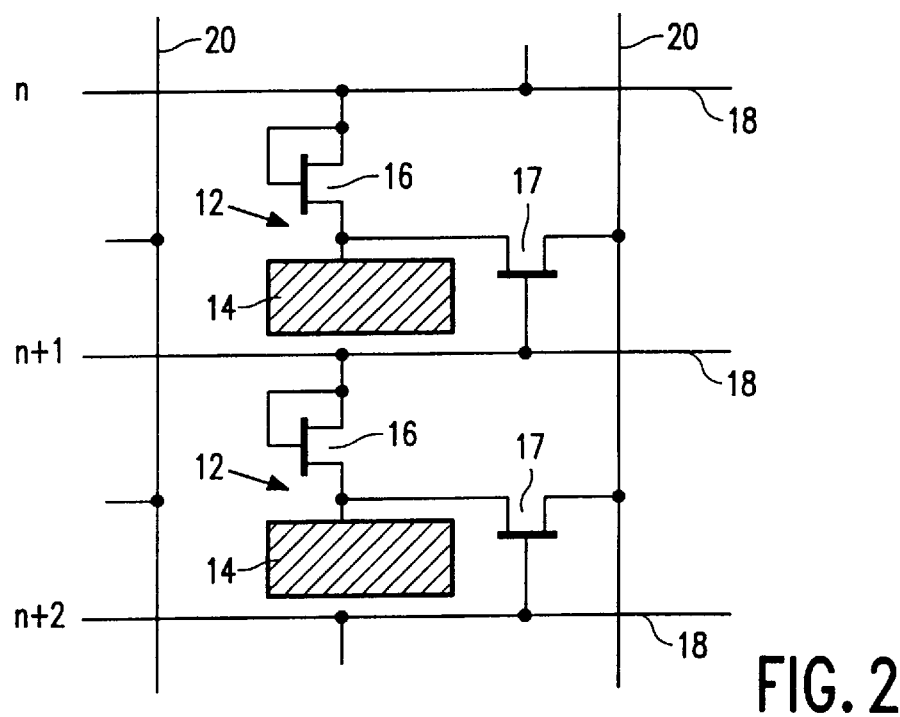
FIG. 2 shows schematically the equivalent circuit of two typical sense elements in the array of the device of FIG. 1.

Referring also to FIG. 2, each sense element of the array comprises a sense electrode 14 connected to a first switching device, which in this embodiment comprises a three terminal switching device 16 in the form of an n-type field effect transistor (FET) and a second switching device 17 also in the form of an n-type FET. The X-Y array of sense elements is addressed via a set of regularly-spaced row (selection) address conductors 18 and a set of regularly—spaced column (sensing) address conductors 20 with individual sense elements being located at respective intersections of the two sets of conductors. All sense elements in the same row are connected to an adjacent pair of row conductors 18 and all sense elements in the same column are connected to a respective, common, column conductor 20. The row conductors 18 are connected at their one ends to a row driver circuit 22, comprising a digital shift register circuit, and the column conductors 20 are connected at their one ends to a sense circuit, 24.

As can be seen in FIG. 2, each row conductor 18, apart from the first and the last, is associated with, and shared by, the sense elements in two adjacent rows. The gate electrode and source terminal of the first FET 16 of each sense element in one row are interconnected, and thus connected to the same row conductor 18, e.g. the $n^{th}$ conductor, while its drain is connected to the sense electrode 14. The gate electrode of the second FET 17 of each sense element in the row is connected to the other associated row conductor 18, i.e. the succeeding $(n+1)^{th}$ row conductor, and the source and drain terminals of this second FET 17 are connected respectively to the sense electrode 14 and the associated column conductor 20. The gates of the first and second FETS 16 and 17 of each of the sense elements in the next row are connected respectively to the $(n+1)^{th}$ and $(n+2)^{th}$ row conductors 18, and so on. The sense elements 12 and address conductors 18 and 20 of the pad 10 are fabricated using standard thin film technology as used in active matrix addressed display devices for example, and as such it is not thought necessary to describe here the manner of fabrication in detail. Briefly, it involves the deposition and definition by photolithographic processes of a number of layers on an insulating substrate. The electrodes 14 and sets of address conductors 18 and 20 can be formed of metal and the FETs 16 can be formed as amorphous silicon or polycrystalline silicon thin film transistors (TFTs) using an appropriate insulating substrate e.g. of glass, polymer, or quartz. The first switching devices need not comprise FETs but could instead be diode structures, for example thin film p-i-n devices or other two terminal non-linear switching devices connected between the row conductor and the sense electrode. While it is preferred to use thin film device technology, it will be appreciated that the sensing pad 10 could alternatively be fabricated using a semiconductor wafer and integrated circuit technology.

Figure 3:
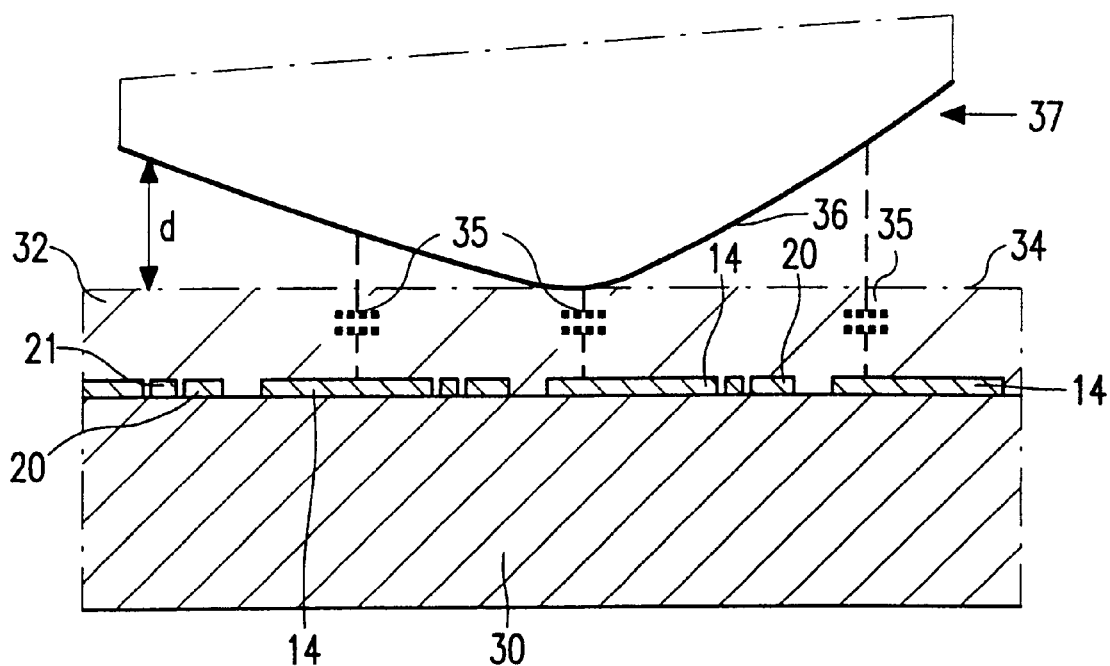
FIG. 3 is a schematic cross-sectional view through a part of the sensing device illustrating the manner of its operation.

An example of one form of array construction is shown schematically and simplified in FIG. 3 which is a cross-section through a representative part of the pad 10 comprising three complete sense electrodes 14. The TFT devices 16 and 17, which are not visible in this section, are formed on an insulating substrate 30 from a deposited layer of amorphous or polycrystalline silicon material, constituting the TFTs' channels, with a deposited layer of dielectric material, for example silicon nitride, constituting the gate insulator layers of the TFTs. The sense electrodes 14, comprising regularly spaced and equally sized rectangular conductive pads, and the set of address conductors 20 extending therebetween are defined from a deposited metal layer. Integral extensions of the electrodes 14 respectively form the drain contacts and source contacts of the TFTs 16 and 17 respectively and integral extensions of the conductors 20 form the drain contacts of the TFTs 17. Insulating material is provided between the conductors 18 and 20 at the regions where they intersect. The set of row conductors 18, not visible in FIG. 3, is formed from a deposited metal layer with each row conductor extending between adjacent rows of sense electrodes 14 and having integral extensions spaced along its length, for example as indicated at 21 in FIG. 3, which serve as gate electrodes of the TFTs 16 and 17.

To complete the structure of the sensing device, a dielectric film 32, for example of silicon nitride or polyimide, is deposited completely over the structure on the substrate 30 to provide a continuous sensing surface 34 spaced from, and substantially parallel to, the substrate surface.

The physical dimensions of the sense electrodes 14 are chosen in accordance with the desired resolution characteristics in fingerprint sensing. By way of example, the sense electrodes may have a pitch of around 50 to 100 micrometres in both the row and column directions. The thickness of the insulating film 32 is selected taking into account the value of the relative permittivity of the material used for this film. For example, for a relative permittivity of approximately 4, a film thickness of around 0.5 micrometres may be used.

In operation of this sensing device, a finger whose print is to be scanned is placed on the sensing surface 34. Actual, or close, physical contact with the surface 34 then occurs at the ridges of the fingerprint, as illustrated in FIG. 3 where one ridge 36 of part of the finger surface 37 is depicted. Troughs in the fingerprint profile are spaced from the surface 34 by a considerably greater distance. The ridged finger surface is therefore spaced from the array of electrodes 14 by a minimum distance determined by the thickness of the thin insulating film 32. Each sense electrode 14 and the respective overlying portion of the finger surface form opposing plates of a capacitor 35, as depicted by dotted lines in FIG. 3, with the upper plate, constituted by the finger surface portion, being effectively at ground potential. The intervening insulating film 32, and any air gap present between the finger surface portion and the sensing surface 34, provide the capacitor dielectric. The capacitances of these individual capacitors vary as a function of the spacing, d, between the finger surface and the sensing surface 34, with larger capacitances occurring where the fingerprint ridges are in contact with surface 34 and smaller capacitances occurring where the troughs in the fingerprint overlie the sense electrodes 14. The variation in capacitances produced over the array of sensing elements 12 of the pad 10 by a fingerprint ridge pattern thus constitutes in effect an electronic "image" of the three dimensional form of the fingerprint surface. These capacitances are sensed within the sensing device and an output provided indicative of the variation, and hence the three-dimensional profile of the fingerprint.

Figure 4:
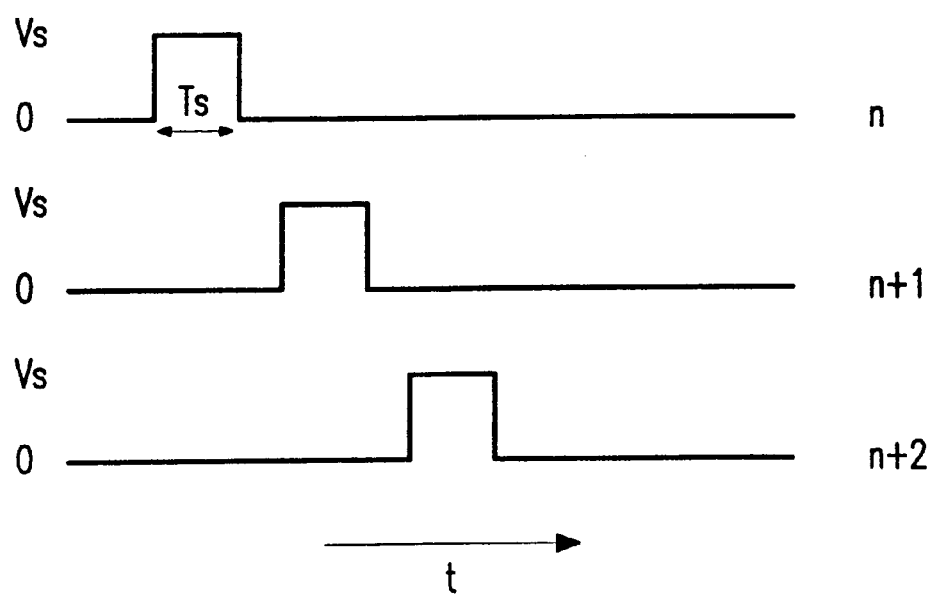
FIG. 4 illustrates typical drive waveforms used in operation of the device.

Sensing the capacitance variation between the individual sense elements 12 in the array is accomplished as follows. Each sense element is addressed through its associated row, selection, and column, sensing, conductors 18 and 20. The row driver circuit 22 is arranged to provide a control signal comprising a selection (gating) signal in the form of a voltage pulse to each row address conductor 18, one at a time in turn, and so each row conductor, starting at row 1, receives a selection signal in sequence. An example of drive waveforms applied to three successive row conductors is shown in FIG. 4. A selection pulse signal, Vs, applied to a row conductor 18, e.g. the nth row conductor, turns on the TFTs 16 of all sense elements 12 in the row causing the associated capacitors 35 of the row of sense elements to be charged to approximately the level of the pulse signal, i.e. Vs. Upon termination of this selection signal Vs, the TFTs 16 turn off and charge is held on each of the capacitors 35 of the row, the amount of charge, q, stored in each capacitor being dependent on its capacitance, C, and approximately equal to C.Vs. Almost immediately thereafter a selection pulse signal is applied to the succeeding, $(n+1)^{th}$, row conductor 18 which similarly turns on the TFTs 16 of the sense elements in the next row and charges up their associated capacitances 35. At the same time, this subsequent selection signal also turns on the TFTs 17 of the previous row of sense elements, effectively connecting each of the sense electrodes 14 of the sense elements in that row to its respective associated column conductor 20. The column conductor is at virtual earth and the charge held on the electrode 14 flows in the column conductor where it is detected by a charge sense amplifier in the circuit 24. The charges stored in the capacitors of each of the sense elements in the row are simultaneously read-out and detected in this way via their respective column conductors 20 and respective charge sense amplifiers in the circuit 24. The amount of charge from each capacitor depends on the size of the capacitor and thus is determined according to whether a ridge or a trough of a fingerprint overlies the sense electrode 14 concerned. If a ridge overlies an electrode 14, a certain amount of charge will be read out whereas if a trough overlies the electrode the amount of charge read out will be substantially zero.

In this way, therefore, a single selection pulse applied to a row conductor is effective to charge up the capacitors of the sense elements in one row and read out the capacitors of the sense elements of the immediately preceding row. Each row of sense elements is addressed in this manner in a row address period, corresponding to the duration of two successive selection signals, by the sequential application of a selection signal to the row conductors 18. In this way, the fingerprint is scanned and a complete "image" of the capacitor characteristics is built up following the addressing of all rows in the array in one complete field period. Typically, the selection signal Vs can be of around 20 microseconds in duration, Ts, enabling around seventy frames per second.

Figure 5A:
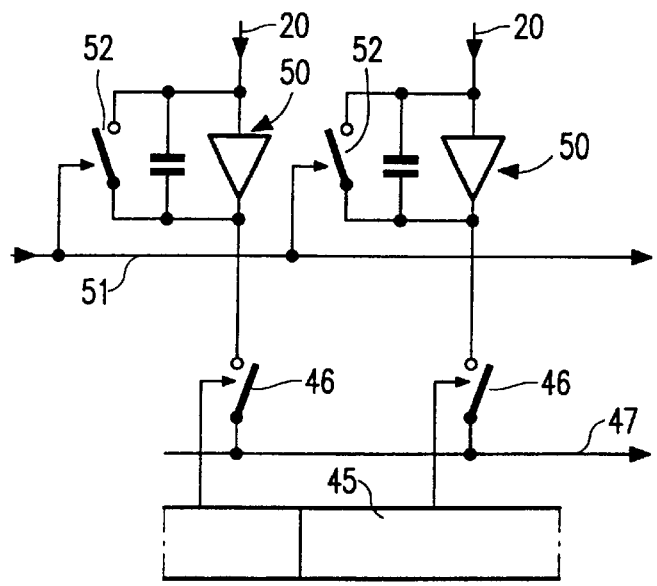
FIGS. 5a and 5b illustrate alternative forms of sense circuits for use in the device.

FIG. 5a illustrates the charge sense amplifier configuration of the circuit 24, the part shown serving two adjacent column conductors 20. In this circuit, the column conductors 20 are connected to charge amplifiers 50 with capacitive feedback whose analogue outputs are similarly switched in succession by means of a shift register 45 operating switches 46 to provide on output line 47 a serial train of pulses whose magnitude is indicative of the charge flow in each column conductor. The charge amplifiers 50, which set the virtual earth level for the column conductors, are reset in the period between addressing successive rows of sense elements by a reset pulse applied to a reset line 51 which operates switches 52 to discharge the shunt capacitors of the amplifiers.

Figure 5B:
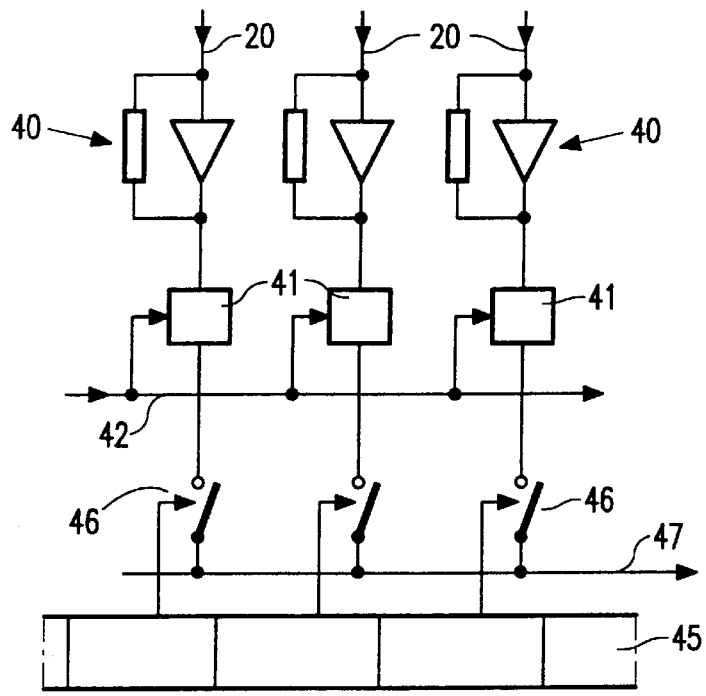

In FIG. 5b there is shown part of an alternative sensing circuit, for three adjacent column conductors, using current sensing amplifiers. The column conductors 20 are connected to respective current amplifiers 40 with resistive feedback whose outputs are supplied to sample and hold circuits 41. The bias condition of the amplifiers sets the aforementioned virtual earth level on the column conductors 20. These circuits 41 are operated simultaneously, and in synchronism with the gating pulse applied to a row conductor 18, by means of a sampling pulse supplied along a common line 42. The analogue outputs of the circuits 41 are switched in succession by means of a shift register 45 operating switches 46 in sequence to provide a serial output of pulses along line 47 whose magnitudes are indicative of the instantaneous current values in each of the conductors 20.

Other suitable types of sense means, for example comprising digital latch type circuits, could be utilized.

As the capacitor 35 of each sense element in a row is charged and then immediately discharged for read-out in one row address period there is no need for an integration period or for the sense elements to be reset prior to a subsequent address period. The sense elements in a row are effectively discharged at the end of the row address period. Several readings of the capacitance image of a fingerprint can be taken in rapid succession over consecutive field periods, or readings of different fingerprints in consecutive operations can be performed easily if desired. Fast scanning with read-out of the sense elements of the array is possible, the charge/discharge cycle of a row of sense elements taking only a few microseconds. The leakage requirements for the TFTs 16 and 17 is less critical than with the known device of U.S. Pat. No. 5,325,442 and the need for a high uniformity of this characteristic in the TFTs across the array is less important. The source terminals of the TFTs 16 are at zero volts except for the relatively short period of a selection signal on the row conductor. It can be expected that the TFTs 16 and 17 will exhibit some gate/source capacitance. During read-out of a sense element the capacitor 35 discharges to 0V (the column conductor potential). The falling edge of the selection signal Vs applied to the TFT 17 may couple a voltage to the junction between the sense electrode 14 and the TFT 16. If a ridge overlies this sense electrode 14, the capacitance of the capacitor 35 is large compared to the gate/source capacitance of the TFTs 16 and 17. If a trough overlies the sense electrode 14, however, the capacitance is small and comparable to, or less than, the gate/source capacitance. Consequently, a small voltage could exist at this junction after termination of the row address period but this can be reduced if necessary by using a self-aligned process when fabricating the TFTs and/or by appropriately scaling the TFTs 16 relative to the TFTs 17. The generally low steady state voltage across the source-drain terminals of the TFTs 17 implies negligible vertical crosstalk currents in the column conductors. The device has the further advantages of requiring a very simple drive scheme, entailing the provision of simple voltage pulse signals to the row conductors in succession. This allows a simple form of row driver circuit to be utilised, and offers a very good signal to noise ratio.

While in the above embodiment each row conductor 18 is shared by two adjacent sense element rows, each row of sense elements could instead be connected to its own respective pair of row conductors but this would require the provision of two separate row conductors between each adjacent rows of sense elements. Also, the voltage supplied to the sense electrodes of a row of sense elements could be provided by an auxiliary conductor extending in the row direction and between the two row conductors 18 associated with the row of sense elements to which the source terminals of the TFTs 16 are connected. The auxiliary conductors for all the rows of sense elements would be interconnected at one side of the array, preferably the side opposite the row driver circuit 22, and coupled to a potential source at an appropriate level. The capacitors of the sense elements would then be charged to this voltage level rather than a level slightly less than Vs due to a voltage drop across the TFTs 16.

The drive circuit of the device, comprising the row driver circuit 22 and the sensing circuit 24, may be integrated on the same substrate as that carrying the array of sense elements and fabricated simultaneously with the components of the sense elements thereby providing an inexpensive and compact sensing device. Such integration is conveniently achieved using polysilicon thin film technology. If low temperature polysilicon process technology is employed, the substrate can be of plastics material, and particularly a flexible polymer material. Such a sensing device can readily be incorporated in a smart card.

Strips of conductive material may be provided directly on the upper surface of the insulator/dielectric 32 of the device extending over the spaces between adjacent rows or adjacent columns, or both, of the sense electrodes 14, for example as lines or in a grid pattern, and grounded electrically.

A matrix of discrete, electrically conductive pad electrodes may be provided on the surface of the insulating layer, each overlying and similar in size and shape to a sense electrode 14, to form the opposite plates of the capacitors 35. Ridges of a fingerprint ground particular ones of these pad electrodes where they are in contact and the capacitance of the capacitors 35 is then determined by the area of the sense electrodes 14 and their opposing pad electrodes and the thickness of the intervening insulating layer 32 so that substantially identical, and more distinctive, capacitances are obtained at all ridge contact locations. Elsewhere, surface portions of the finger are spaced from their underlying pad electrodes and the capacitance values are dependent on this spacing as before.

Figure 6:
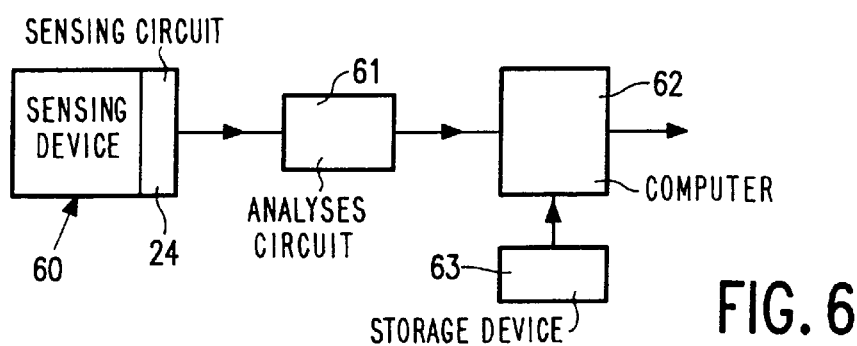
FIG. 6 illustrates in simple block diagram form, a fingerprint recognition system using the sensing device.

FIG. 6 shows in schematic block form a fingerprint recognition system incorporating the sensing device, here represented by the block 60. The system includes means responsive to an output from the sensing circuit of the device to provide characteristical data of a sensed fingerprint, and means for comparing said characteristical data with stored characterisical data for one or more fingerprints. The output obtained from the sensing device is provided in a form comparable to the video output provided by an image sensor in known optical fingerprint sensing devices. Accordingly, and as will be apparent to skilled persons, components of the system, other than the sensing device, can be generally of the kind employed in systems using optical sensing devices. The characteristical data, in accordance with standard practice, may take the form of information regarding the orientation of ridge lines and relative positions of minutiae, that is, the endings and bifurcations of the lines. The processing of information obtained from the sensing device to produce and compare characteristical data can follow known schemes and techniques. Because the sensing device of the invention is capable of providing information of the three dimensional profile of a fingerprint, improved accuracy of identification or verification can be obtained by making use of topological features in addition to the spatial positions of minutiae. Of course use may be made only of information in respect of the two-dimensional ridge patterns to simplify the processing necessary—if less accuracy is acceptable. Briefly, the output from the device 60, suitably conditioned, is fed to an analysis circuit 61 which is programmed to detect characterizing features of the fingerprint sensed such as the position of minutiae. Data from the circuit 61 is supplied to a computer 62 which through, standard algorithms, compares the data with characteristical data of a plurality of fingerprints (or a single fingerprint depending on whether the system is used for identification or merely verification purposes) held in a storage device 63. Computer 62 provides an output in accordance with whether or not a match has been found.

The circuit 61 can be programmed either to utilize the three dimensional information provided by the sensing device for high accuracy of recognition, or alternatively, with appropriate discrimination, to select particular output signal values from the device 60. These output signal values utilize specific information representative of the two dimensional ridge pattern in the nature of a binary image similar to that obtained from known optical sensing devices.

In summary, therefore, a fingerprint sensing device has been disclosed which comprises an array of sense elements each of which includes a sense electrode which, together with an overlying fingerprint portion, forms a capacitor. The capacitor is charged by operation of a first switching device via a first address conductor. A second switching device is then operated to transfer the charge in the sense electrode to a second address conductor where it is sensed and an output indicative of capacitance provided accordingly. Fast, reliable, scanning is achieved. A row and column array of sense elements is conveniently addressed using sets of row and column conductors and the device can readily be implemented using thin film devices, e.g. TFTs, as the switching devices on an insulating support and with integrated drive circuits.

From reading the present disclosure, other modifications will be apparent to persons skilled in the art. Such modifications may involve other features which are already known in the field of fingerprint sensing and component parts thereof and which may be used instead of or in addition to features already described herein.

I claim:

1. A fingerprint sensing device comprising:
   an array of sense elements, each sense element including a sense electrode and a first switching device coupled to each sense electrode;
   a first address conductor controlled by a control signal generated by a drive circuit, said first address conductor effective to provide a charge to said sense electrodes through said first switching device;
   a sensing surface, spaced from said sense electrode, and operable to receive a finger having a fingerprint placed upon said sensing surface;
   said sensing surface, a portion of said finger, and said sense electrodes, forming a plurality of capacitors each having a capacitance;
   a second address conductor coupled to said sense electrodes with a second switching device disposed therebetween; and
   said second switching device being controlled by said drive circuit, following operation of said first switching device, to discharge a charge produced on said sense electrode and to transfer said charge to said second address conductor.

2. A fingerprint sensing device according to claim 1, wherein: the sense elements are arranged in rows and columns and connected to sets of first and second address conductors extending in the row and column directions, the first switching devices of each sense element in a row being connected to a common address conductor of the first set and the second switching devices of each sense element in a column being connected to a common address conductor of the second set.

3. A fingerprint sensing device according to claim 2, wherein: the drive circuit is arranged to supply a control signal to each of the address conductors of the first set in sequence so as to operate the first switching devices of the sense elements on a row by row basis.

4. A fingerprint sensing device according to claim 3, wherein:
   the second switching devices of the sense elements in a row are coupled to an address conductor of the first set which is different than that which the first switching devices of the row of sense elements are connected and
   said second switching devices are operable by a control signal applied to the different address conductor.

5. A fingerprint sensing device according to claim 4, wherein: the address conductor of the first set to which the second switching devices of a row of sense elements are coupled comprises an address conductor to which the first switching devices of the adjacent row of sense elements are connected.

6. A fingerprint sensing device according to claim 1, wherein: the first and second switching devices of the sense elements comprise transistors.

7. A fingerprint sensing device according to claim 6, wherein: a first main terminal and the control electrode of each of the first switching devices in a row of sense elements are connected to the same address conductor.

8. A fingerprint sensing device according to claim 6, wherein: the transistors comprise thin film transistors which together with the sets of first and second address conductors and the sense electrodes of the sense elements are carried on an insulating substrate.

9. A fingerprint sensing device according to claim 8, wherein: the drive circuit and sense means are integrated on the same substrate as that of the array of sense elements.

10. A fingerprint sensing device according to claim 6, wherein: the sense elements and sets of first and second address conductors comprise an integrated circuit on a semiconductor wafer substrate.

11. A fingerprint sensing device according claim 1, wherein: the sense electrodes of the array of sense elements are covered by a dielectric whose surface provides said sensing surface.

12. A fingerprint recognition system comprising a fingerprint sensing device according to claim 1, further comprising, means responsive to the output from the sense means to provide characteristical data of a sensed fingerprint, and means for comparing said characteristical data with stored characteristical data for one or more fingerprints.

13. A method of sensing a fingerprint, said method comprising:
   providing an array of sense elements, each sense element including a sense electrode and a first and second switching device coupled to the sense electrodes;
   providing a first and second address conductor coupled to said sense electrodes through said first and second switching devices respectively;
   providing a sensing surface, spaced from said sense electrodes, and operable to receive a finger having a fingerprint placed upon said sensing surface, wherein said sensing surface, a portion of said finger, and said sense electrodes, form a plurality of capacitors each having a capacitance;

placing said finger on said sensing surface;

activating said first switching device thereby charging said capacitors;

activating said second switching device, after deactivating said first switching device, said second switching device thereby causing said capacitors to discharge; and measuring said discharge to sense said fingerprint.

* * * * *